Sept. 22, 1964 D. S. STRADER Re. 25,643
HYDRAULIC CONTROL VALVE OPERATING RESPONSIVE
TO HYDRAULIC LOAD PRESSURES
Original Filed Jan. 9, 1959
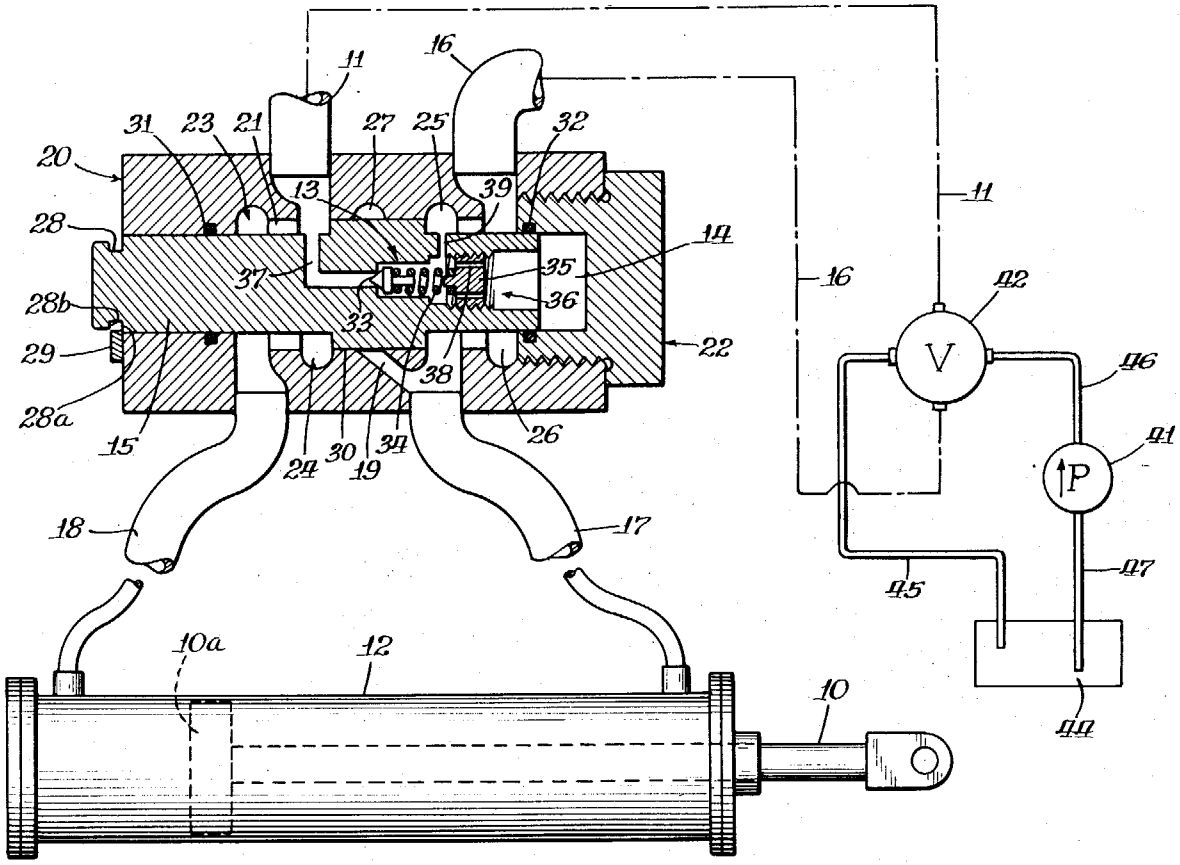
INVENTOR.
Don S. Strader
BY
Attys.

United States Patent Office

Re. 25,643
Reissued Sept. 22, 1964

25,643

HYDRAULIC CONTROL VALVE OPERATING RESPONSIVE TO HYDRAULIC LOAD PRESSURES

Don S. Strader, Mount Prospect, Ill., assignor to The Frank G. Hough Co., a corporation of Illinois Original No. 2,994,345, dated Aug. 1, 1961, Ser. No. 785,936, Jan. 9, 1959. Application for reissue June 26, 1962, Ser. No. 207,451
12 Claims. (Cl. 91—415)

Matter enclosed in heavy brackets [ ] appears in the original patent but forms no part of this reissue specification; matter printed in italics indicates the additions made by reissue.

This invention relates generally to hydraulic valve and motor arrangements, and more specifically to an improved hydraulic valve and double acting motor arrangement automatically providing increased speed of the motor in extending when the load upon the motor is relatively light.

Double acting hydraulic motors of the piston and cylinder type are commonly used in the tractor loader art to power the members thereof in the various digging operations of the loader. In many material handling operations it oftentimes occurs that the load upon the hydraulic motor in extending is light, and under such conditions it is often desirable that the speed of operation of the motor be increased. This has been difficult to accomplish without increasing the output of the hydraulic pump providing hydraulic fluid for operation of the motor.

It is the object of the present invention to provide a hydraulic valve and double acting motor arrangement wherein a valve will automatically operate responsive to either a relatively light or heavy load upon the motor to provide relatively slow extension of the motor under heavy loads and an increased movement or speed under light loads without any increase in the output of the hydraulic pump supplying hydraulic fluid to the motor.

It is a further object of the present invention to provide a hydraulic valve for use in a hydraulic system of a hydraulic pump and motor, which valve will automatically operate during the extension of the hydraulic motor under a light load to increase the speed of the extension of the motor without an increase in the output of the pump.

It is a further object of the present invention to provide a hydraulic valve for use with a double acting hydraulic motor which will automatically operate irrespective of the initial loading of the motor to provide for increased speed of the motor in extending when the load lightens after the initial operation under a relatively heavy load and to provide for decreased speed of extension of the motor when the loading on the motor becomes relatively heavy after an initial light load without increasing or decreasing the output of the pump.

A feature of the valve of the present invention is the use of a freely sliding spool which is not biased by any coiled springs.

Other objects and features of the present invention will be apparent upon a perusal of the following specification and drawing of which:

FIG. 1 is an enlarged cross-sectional view of a hydraulic valve constructed according to the present invention and a double acting hydraulic motor connected thereto.

The present embodiment is a preferred embodiment but it is to be understood that changes can be made in the present embodiment by one skilled in the art without departing from the spirit and scope of the present invention.

For a general description of the present invention reference is made to the drawing. The subject valve operates to increase or decrease the speed of operation of the hydraulic motor during its extension, the speed of retraction being the same under light or heavy loads.

Assuming the load on the piston rod 10 is heavy, and that hydraulic fluid under pressure is supplied to conduit 11 to extend the piston rod 10 outwardly of the cylinder 12, the relief valve 13 will open to permit hydraulic fluid to enter closed end 14 of the valve bore. Hydraulic fluid under pressure in the end 14 of the valve bore will maintain the valve spool 15 in the position shown, and the hydraulic fluid entering conduit 11 will pass through the valve and conduit 18 and into the cylinder 12 to cause an outward movement of the piston rod 10. Hydraulic fluid from the rod end of the cylinder 12 will flow through conduit 17, the valve and through conduit 16 back to the reservoir.

If the piston rod 10 is under a relatively light load, the hydraulic fluid pressure of the fluid entering the valve from conduit 11 and the pump will not be sufficient to operate relief valve 13, however, that pressure will be sufficient to move the valve spool 15 to the right as shown in the drawing, blocking conduit 16 from fluid communication with conduit 17 and interconnecting conduit 17 with conduit 18 through the passageway 19. This hydraulic fluid from the rod end is added to the hydraulic fluid from the pump entering conduit 11 to cause the piston rod 10 to be moved outwardly from the cylinder 12 at an increased speed.

If at any time during the extension of the hydraulic motor the load varies from that initial load against which the hydraulic motor is working, the pressure relief valve 13 will either be operated or restored depending upon the change in load to cause a movement of the spool 15 to provide for either an increase or decrease in the speed of operation of the hydraulic motor.

Turning next to a detailed description of the present invention, continued reference is made to the drawing. The hydraulic valve comprises a valve body 20 having a valve bore 21 formed therethrough. The closed end 14 is defined by a cap member 22 threaded into a tapped portion of the bore 21 at that end of the valve body 20. The valve body 20 is further provided with four ports to which the conduits 11, 16, 17 and 18 are respectively connected. The four ports are respectively connected directly into four annular grooves *24, 26, 25 and 23* [23, 24, 25 and 26] which are positioned in a certain spaced apart relationship to each other. The valve bore 21 is provided with another annular groove 27 which is positioned between annular grooves 24 and 25. Annular groove 27 is connected by passageway 19 into the port connected to conduit 17.

The valve spool 15 is inserted in the valve bore 21 through the end into which the cap 22 is threaded. One end of the valve spool 15 is movable outwardly of the valve body 20 and that end is provided with an annular slot 28. A locking member 29 is movably secured to the valve body 20, and when in the position shown in the drawing, engages one side *28a* of the slot 28 of the valve spool 15 to limit the outward movement of the valve spool 15 from the valve body 20 [to selectively prevent operation of the valve]. If the locking member 29 is moved into the slot 28, it will engage the other side *28b* of the slot 28 to lock the valve spool 15 in the position shown in the drawing. The valve spool 15 is further provided with a single land 30 which is formed thereon somewhat longitudinally centrally of the valve spool 15. Fluid sealing rings 31 and 32 are also provided and are positioned in suitable annular grooves in the valve body 20 and engage the valve spool 15 to prevent the leakage of hydraulic fluid along the valve spool 15.

The relief valve 13 is carried in the valve spool 15 and comprises a valve head 33, a coiled spring 34, and an adjusting screw 35. The valve head 33 cooperates with a valve seat disposed at the inward end of a valve chamber 36. The other end of the valve chamber 36 opens into the closed end 14 of the valve bore 21. The valve seat is connected by passageway 37 to the outer surface of the valve spool 15 at a point longitudinally thereon which is on the side of the land 30 of the valve spool 15 opposite from the side toward the cap 22. The adjusting screw 35 is threaded into a tapped section within the valve chamber 36 and is provided with a plurality of holes 38 therethrough for the free flow of fluid between opposite sides of the adjusting screw 35. The coiled spring 34 is positioned between the valve head 33 and the adjusting screw 35 and serves to bias the valve head 33 against the valve seat sealing passageway 37 from valve chamber 36. The *adjusting* [set] screw 35 may be threaded inwardly or outwardly of the valve chamber 36 to vary the seating force of the valve head 33 against its valve seat. A further small passageway 39 is provided between the valve chamber 36 and the outer surface of the valve spool 15 on the side of the land 30 toward the cap 22. The passageway 39 serves as a vent to prevent hydraulic locking of the valve spool 15 and to control the time of movement of the valve spool 15.

As noted previously, the outward limit of the valve spool 15 is determined by the locking member 29, and the inward limit of movement of the valve spool 15 is determined by the closed end 14. The annular grooves 23, 24, 27, 25 and 26 and the land 30 are so relatively positioned that when the valve spool 15 is in its outwardmost position as shown in the drawing, annular groove 27 is blocked by the land 30, annular grooves 23 and 24 are interconnected in free fluid communication, and annular grooves 25 and 26 are interconnected in free fluid communication. When the valve spool 15 is moved to its inwardmost position, annular grooves 23, 24 and 27 are interconnected in free fluid communication, and annular grooves 25 is blocked by land 30.

The hydraulic motor which comprises cylinder 12 and piston rod 10 is of the double-acting type with the head end of the cylinder 12 connected to conduit 18 and with the rod end of the cylinder 12 connected to conduit 17. *A conventional double-acting hydraulic motor is constructed so that the inner end of the piston rod 10 terminates in a piston lead 10a having a diameter sufficiently large so that that the piston head 10a engages the inner wall of the cylinder 12 to form an operative double-acting hydraulic motor. It is obvious from the drawing that the diameter of the piston head 10a is substantially greater than the diameter of the piston rod 10.* [It is intended that some hydraulic pump reservoir and valve means (not shown) be provided and connected to conduits 11 and 16 to provide for the selective application of hydraulic fluid under pressure to either of conduits 11 or 16 with the venting of hydraulic fluid from the other conduit.] *A supply portion of the hydraulic circuit in FIGURE 1 of a conventional construction comprises a pump 41, a control valve 42, and a reservoir 44. The control valve 42 is connected to the pump 41 and reservoir 44 through conduits 45, 46 and 47. The control valve 42 is further connected to conduits 11 and 16 which are connected to the valve 20. The control valve 42 is selectively operable in a conventional manner to direct hydraulic fluid to valve 20 through either of conduits 11 and 16 and from valve 20 through the other of these conduits.*

Turning next to a detailed description of the operation of the present invention, continued reference is made to the drawing. Considering first the operation of the instant invention when high pressure hydraulic fluid is delivered to the valve through conduit 16 *from the control valve 42* with the conduit 11 being vented to the reservoir *44*, the high pressure hydraulic fluid will flow into annular groove 26, valve bore 21, annular groove 25, conduit 17 to the rod end of the hydraulic motor. From the head end of the hydraulic motor, hydraulic fluid will flow through conduit 18, annular groove 23, valve bore 21, annular groove 24, and conduit 11 to the reservoir. The relief valve 13 will not be operated at this time due to the relatively low pressure in passageway 37. The hydraulic fluid pressure in annular groove 25 acting on the side of the land 30 will maintain the valve spool 15 in its outwardmost position as shown in the drawing and the hydraulic motor will be retracted.

Assuming next that high pressure hydraulic fluid is delivered to conduit 11 *from the control valve 42* and that conduit 16 is *vented* [vented] to the reservoir *44*, and that a relatively heavy load is applied to the piston rod 10, the high pressure hydraulic fluid will flow from conduit 11 into annular groove 24 and from annular groove 24 into passageway 37 and valve bore 21. From valve bore 21 the fluid will flow into annular groove 23, and conduit 18 to the head end of the hydraulic motor. The high pressure hydraulic fluid in passageway 37 will exert a force against the valve head 33 sufficient to unseat the valve head 33 and the hydraulic fluid will then flow through the valve chamber 36 and passageways 38 of the adjusting screw 35 to the closed end 14 of the valve bore 21. Since spool 15 is designed to have a larger area exposed on the end cooperating with closed end 14 than the area on the end of the land 30, this hydraulic fluid in the closed end 14 will exert a sufficient force on the end of the valve spool 15 to maintain the valve spool 15 in the position shown in the drawing. As the hydraulic motor is extended under the relatively heavy load, hydraulic fluid will flow from the rod end through conduit 17, annular groove 25, valve bore 21, annular groove 26 and conduit 16 to the reservoir *44*.

Assuming next the condition wherein high pressure hydraulic fluid is delivered through conduit 11 *from the control valve 42* and conduit 16 is connected to the reservoir *44*, and that the loading upon the piston rod 10 is relatively light, the hydraulic fluid in passageway 37 will not be of a pressure sufficient to unseat valve head 33 from its valve seat. However, the hydraulic fluid in annular groove 24 will act upon the side of the land 30, and since the other side of the land 30 is connected to the reservoir through conduit 16, it will move the valve spool 15 to its inwardmost position. The hydraulic fluid under pressure in annular groove 24 will then flow through valve bore 21, annular groove 23, conduit 18 to the head end of the hydraulic motor. As the hydraulic motor is extended under the relatively light load, the hydraulic fluid in the rod end thereof will flow through conduit 17, passageway 19, annular groove 27, and valve bore 21 to annular groove 24, thus adding the fluid flow from the rod end to that being supplied to the head end of the hydraulic motor thereby increasing the speed of movement of the hydraulic motor in extending. Since at this point the annular groove 26 is blocked from any fluid communication with annular groove 25, no hydraulic fluid will flow to the reservoir through conduit 16.

Assuming next the immediately above described condition of extension of the hydraulic motor under light load, and assuming further that during the extension of the hydraulic motor the load thereon is suddenly increased to a relatively heavy load, since passageway 37 is still connected to annular groove 24 through the valve bore 21, the increased pressure in annular groove 24 caused by the application of a relatively heavy load will in acting through passageway 37, unseat valve head 33 permitting hydraulic fluid to flow to the closed end 14. The pressure of the hydraulic fluid in closed end 14 will cause the valve spool 15 to be moved to its outward-most position as shown in the drawing thereby blocking annular groove 27 and interconnecting conduit 17 with conduit 16. The operation will cause a reduction in the speed of extension of the hydraulic motor. The converse will occur if the hydraulic motor is being extended under a heavy load and the load lightens considerably during the operation of the motor. In such a situation the lower pressure in passageway 37 will permit valve head 33 to seat itself and the hydraulic fluid pressure in annular groove 24 will move the valve spool 15 to its inwardmost position. As the valve spool 15 is moved toward the inwardmost position, hydraulic fluid in the closed end 14 and the valve chamber 36 will flow through the vent passageway 39 into the valve bore 21.

*It is evident from the foregoing description and the drawing of the invention that because of the construction of valve bore 21 with the two spaced apart annular grooves 23 and 24, relative to the construction and range of movement of valve spool 15, that conduits 11 and 18 are in communication at all times regardless of the position of valve spool 15.*

Having described the subject invention, what is new and desired to be protected by Letters Patent is:

[1. In a hydraulic system having means selectively operable to supply hydraulic fluid under pressure to either of two conduits and to receive hydraulic fluid from the other of said two conduits, a valve connected to said two conduits, a double-acting hydraulic ram connected to said valve, said valve comprising means operating responsive to the hydraulic fluid pressures in said two conduits for passing hydraulic fluid above a certain predetermined pressure from said conduits to said hydraulic ram and for passing hydraulic fluid received from said hydraulic ram to said conduits, and means operating responsive to a reduction in hydraulic fluid pressure at the one of said conduits supplying hydraulic fluid to extend said ram below said certain predetermined pressure for diverting the return of hydraulic fluid from the rod end of said hydraulic motor to the head end thereof.]

2. In a hydraulic system having means selectively operable to supply hydraulic fluid under pressure to either of two conduits and to receive hydraulic fluid from the other of said two conduits, a valve having four valve ports, one of said two conduits connected to the first of said ports, the other of said two conduits connected to the fourth of said ports, a double-acting piston and cylinder hydraulic motor, conduit means connecting the head end of said hydraulic motor to the second and the rod end of said hydraulic motor to the third of said four valve ports, said valve comprising a valve spool freely slidably carried in a valve bore, said valve spool having a land formed thereon and positioned so that one side of said land is in free fluid communication with said first port and the other side of said land is in free fluid communication with said fourth port, said four valve ports being connected into said valve bore at positions so that high pressure hydraulic fluid at the other of said conduits and low pressure hydraulic fluid at said one of said two conduits moves said valve spool to interconnect said one of said conduits and the head end of said hydraulic motor in free fluid communication and connects the other of said conduits and the rod end of said hydraulic motor in free fluid communication, said four valve ports further positioned so that a hydraulic fluid pressure at said one of said two conduits of a pressure higher than the pressure at the other of said two conduits but lower than a certain predetermined pressure will move said valve spool to interconnect the head and rod ends of said hydraulic motor with said one of said two conduits, and will block said fourth port, said spool including hydraulically operated valve means operating responsive to a hydraulic fluid pressure at said one of said two conduits higher than said certain predetermined pressure for moving said spool to interconnect said one of said two conduits and the head end of said hydraulic motor in free fluid communication and to interconnect said other of said two conduits and the rod end of said hydraulic motor in free fluid communication.

3. In a hydraulic system having means selectively operable to supply hydraulic fluid under pressure to either of two conduits and to receive hydraulic fluid from the other of said two conduits, a valve having four valve ports, the first and fourth of said valve ports connected to said two conduits, a hydraulic ram having a port at each end thereof for extension and retraction of the piston rod thereof, the head end of said hydraulic ram connected to the second of said ports, the rod end of said hydraulic ram connected to the third of said ports, said valve comprising spool means carried in said valve in cooperation with said four valve ports and operating responsive to a greater hydraulic fluid pressure at said fourth port than said first port to interconnect the first and second of said ports in free fluid communication and the third and fourth of said ports in free fluid communication, and operating responsive to a certain hydraulic fluid pressure at said first of said ports and greater than any pressure at said fourth of said ports to interconnect the first and second of said ports in free fluid communication and the third and fourth of said ports in free fluid communication, said spool means further operating responsive to a substantial decrease in said certain hydraulic fluid pressure at the first of said ports to interconnect said first, second and third ports in free fluid communication and to block said fourth port.

4. In a hydraulic system having means selectively operable to supply hydraulic fluid under pressure to either of two conduits and to receive hydraulic fluid from the other of said two conduits, a valve having four valve ports, the first and fourth of said valve ports respectively connected to said two conduits, a hydraulic ram having a port at each end thereof for extension and retraction of the piston rod thereof, the head end of said hydraulic ram connected to the second of said ports, the rod end of said hydraulic ram connected to the third of said ports, said valve comprising spool means carried in said valve in cooperation with said four valve ports and operating responsive to a greater hydraulic fluid pressure at said fourth port than said first port to interconnect the first and second of said ports in free fluid communication and the third and fourth of said ports in free fluid communication, and operating responsive to a certain hydraulic fluid pressure at said first port and greater than any pressure at said fourth port to interconnect said first, second and third ports in free fluid communication and to block said fourth port, a hydraulic fluid chamber formed in said valve at one end of said spool means, a second hydraulic valve formed in said spool means and connected between the end of said spool means at said chamber and the surface of said spool means, said second valve operating responsive to an increase in hydraulic fluid pressure at the first of said ports above said certain hydraulic fluid pressure to admit hydraulic fluid to said chamber to operate said spool means to interconnect said first and second ports in free fluid communication and to interconnect said third and fourth ports in free fluid communication.

5. In a hydraulic system as claimed in claim 4, wherein said second valve comprises a spring loaded check valve disposed in said spool means and includes means for adjusting the spring loading thereof, and a vent passageway formed in said spool means between said chamber and said fourth port to permit hydraulic fluid to bleed from said chamber at a rate substantially lower than the flow of any hydraulic fluid through said check valve.

6. A hydraulic valve and motor arrangement comprising a hydraulic cylinder having a hydraulic conduit at each end thereof and a reciprocating piston slidably carried therein, a valve body having four ports, the first of said ports connected to the conduit at one end of said cylinder, the fourth of said ports connected to the conduit at the other end of said cylinder, valve spool means slidably carried in said valve body for operation to two different positions and for cooperation with said four valve ports so that in one operated position of said valve spool means said first *port* and *the* second *of said* ports are inerconnected in free fluid communication and *the third of said ports and said fourth port* [said third and fourth ports] are interconnected in free fluid communication, and so that in the other operated position of said valve spool means said first and second ports are interconnected in free fluid communication and said third and fourth ports are interconnected in free fluid communication when any load upon said motor is of a relatively high value and so that said first, second and fourth ports are connected in free fluid communication and said third port is blocked when any load upon said motor is of a value substantially less than said relatively heavy load.

7. In a hydraulic fluid control valve, four valve ports, valve means carried in said valve in cooperation with said four valve ports and operating responsive to a certain hydraulic fluid pressure at the first of said ports to interconnect the first and second of said ports in free fluid communication and the third and fourth of said ports in free fluid communication, said valve means further operating responsive to a substantial decrease in said certain hydraulic fluid pressure at the first of said ports to interconnect said first, second and third ports in free fluid communication and to block said fourth port.

8. A control valve comprising a valve bore having one end thereof closed, a valve spool having a land formed thereon and slidably carried in said valve bore, five annular grooves formed in said valve bore in a certain spaced apart relationship, four valve ports, the first of said valve ports connected into the first of said annular grooves, the second of said valve [bores] *ports* connected into the second of said annular grooves, the third of said valve *ports* [bores] connected into the third of said annular grooves, and the fourth of said valve ports connected into the fourth and fifth of said annular grooves, an adjustable relief valve carried in said valve spool and connected between the outer surface of said valve spool and the end thereof adjacent said closed end of said bore, said five annular grooves, said land, and the opening of said relief valve in the outer surface of said valve spool relatively positioned so that said first and second annular grooves are interconnected in free fluid communication, said third and fourth annular grooves are connected in free fluid communication, said fifth annular groove is blocked by said land and said opening of said relief valve in the outer surface of said spool is interconnected with said second annular groove in free fluid communication when said valve spool is positioned in one operated position, and so that said first, second and fifth annular grooves and said opening of said relief valve in said spool are connected in free fluid communication and said fourth annular groove is blocked by said land when said valve spool is positioned in another operated position.

9. In a hydraulic fluid control valve, a valve bore having one end thereof closed, a valve spool slidably carried in said valve bore, the inner end of said spool being formed to define a chamber with the closed end of said bore and engageable therewith to provide one operated position thereof, means for limiting the outward movement of said spool to provide another operated position thereof, four ports connected into said bore in a certain spaced-apart relationship, said spool having a land formed and positioned thereon so that the first, second and third of said ports are interconnected in free fluid communication and the fourth port is blocked when said spool is moved to said one operated position by a hydraulic force on the side of said land cooperating with said first port, and so that said first and second ports are connected in free fluid communication and said third and fourth ports are connected in free fluid communication when said spool is moved to said another operated position by a hydraulic force on the other side of said land and cooperating with said fourth port, and means for admitting hydraulic fluid under pressure to said chamber to move said spool from said one operated position to said another operated position responsive to a hydraulic pressure at said first port which is above a certain predetermined hydraulic fluid pressure.

10. In a hydraulic fluid control valve, a valve bore heaving one end thereof closed, a valve spool slidably carried in said valve bore, the inner end of said spool being formed to define a chamber with the closed end of said bore and engageable therewith to provide one operated position thereof, means for limiting the outward movement of said spool to provide another operated position thereof, four ports connected into said bore in a certain spaced-apart relationship, said spool having a land formed and positioned thereon so that the first, second and third of said ports are interconnected in free fluid communication and the fourth port is blocked when said spool is moved to said one operated position by a hydraulic force on the side of said land in free fluid communication with said first port, and so that said first and second ports are connected in free fluid communication and said third and fourth ports are connected in free fluid communication when said spool is moved to said another operated position by a hydraulic force on the other side of said land in free fluid communication with said fourth port, a valve formed in said spool and connected between said chamber and the surface of said spool on the side of the land in free fluid communication with said first port, said valve including means operating responsive to a hydraulic fluid pressure at said first port above a certain predetermined pressure to open and deliver hydraulic fluid to said chamber to move said spool from said one operated position to said another operated position.

11. In a hydraulic fluid control valve, a valve bore having one end thereof closed, a valve spool slidably carried in said valve bore, the inner end of said spool having a passageway therein opening into a chamber defined by the closed end of said bore and the end of said spool, the end of said spool being engageable with the closed end of said bore to provide one operated position of said spool, means at the other end of said spool and said valve for limiting the outward movement of said spool to provide another operated position thereof, four ports connected into said bore in a certain spaced-apart relationship longitudinally thereof, said spool having a land formed and positioned thereon between said first and fourth ports so that the first, second and third of said ports are connected in free fluid communication and the fourth port is blocked when said spool is moved to said one operated position by a hydraulic force on the side of said land which is in fluid communication with said first port, and so that said first and second ports are connected in free fluid communication and said third and fourth ports are connected in free fluid communication when said spool is moved to said another operated position by a hydraulic force on the other side of said land which is in free fluid communication with said fourth port, a check valve carried in said passageway in said spool and connected to the outer surface of said spool on the side of said land which is in free fluid communication with said first port, said check valve being formed to operate responsive to a hydraulic fluid pressure at said first port which is above a certain predetermined hydraulic fluid pressure to open to permit hydraulic fluid to flow through said passageway to said chamber to move said spool from said one operated position to said another operated position.

12. In a hydraulic fluid control valve as claimed in claim 11, wherein said check valve comprises a set screw threaded into said passageway, a valve head, and a coiled spring disposed between said set screw and said valve head to bias said check valve to the closed position, said set screw having openings therethrough to permit free hydraulic fluid flow into said chamber.

13. In a hydraulic fluid control valve, four valve ports, valve spool means carried in said valve in cooperation with said four valve ports and freely slidable therein to one position to interconnect the first and second of said four valve ports in free fluid communication and said third and fourth ports of said four valve ports in free communication, and freely slidable to another position to interconnect said first, second and third valve ports in free fluid communication and to block said fourth port, a land formed on said valve spool means at a position so that hydraulic fluid of a certain relatively low pressure at said first port and a lower pressure hydraulic fluid at said fourth port slides said valve spool means to said another position and so that high pressure hydraulic fluid at said fourth port and low pressure hydraulic fluid at said first port causes said valve spool means to slide to said first position, valve means formed in said valve spool means and operating responsive to a hydraulic fluid pressure at said first valve port higher than said certain relatively low pressure to open and permit hydraulic fluid under pressure to act upon one end of said valve spool means to slide said valve spool means to said first position.

References Cited in the file of this patent or the original patent

UNITED STATES PATENTS

| | | |
|---|---|---|
| 523,419 | Thorpe | July 24, 1894 |
| 1,775,856 | Hauser | Sept. 16, 1930 |
| 2,267,284 | Livers | Dec. 23, 1941 |
| 2,367,682 | Kehle | Jan. 23, 1945 |
| 2,376,519 | Stacy | May 22, 1945 |
| 2,502,800 | Renick | Apr. 4, 1950 |
| 2,590,454 | Pilch | Mar. 25, 1952 |
| 2,615,432 | Meddock | Oct. 28, 1952 |
| 2,665,554 | Rockwell | Jan. 12, 1954 |
| 2,814,309 | Koenig | Nov. 26, 1957 |
| 2,916,049 | Ruhl et al. | Dec. 8, 1959 |
| 2,916,050 | Ruhl | Dec. 8, 1959 |